United States Patent [19]

Perez

[11] 4,103,799
[45] Aug. 1, 1978

[54] MULTI-PURPOSE WORKING VEHICLE

[76] Inventor: Hector R. Perez, HN-22 El Comandante Ave., Country Club, Rio Piedras

[21] Appl. No.: 817,261

[22] Filed: Jul. 20, 1977

[51] Int. Cl.² ............................................. B60P 3/12
[52] U.S. Cl. ............................. 214/86 A; 180/26 R; 254/139.1; 280/402
[58] Field of Search ............. 214/86 A, 77 R, 130 R; 280/402; 259/139.1; 180/26 R

[56] References Cited

U.S. PATENT DOCUMENTS

| | | | |
|---|---|---|---|
| 3,048,286 | 8/1962 | Sprague | 214/86 A |
| 3,703,240 | 11/1972 | Russell | 214/86A |
| 3,888,369 | 6/1975 | Kesselring | 214/86 A |

Primary Examiner—Albert J. Makay
Attorney, Agent, or Firm—Brady, O'Boyle & Gates

[57] ABSTRACT

A highly maneuverable, compact and versatile working vehicle features a tricycle chassis having a single rear steering and traction wheel. The vehicle may be electrically powered. It possesses a low elevation hitching mechanism for engaging various types of automotive vehicles requiring hoisting and towing in tight quarters and at various angles. Cooperating with the hitching mechanism is an upper lifting boom and associated power winch means enabling the lifting of an automobile at one end to an adequate height for towing. The coacting hitch and hoisting means can transfer the load of the hoisted vehicle to the safest and most advantageous towing position on the working vehicle to minimize tipping. A unique hoisting boom extension is provided which imparts to the working vehicle a number of additional capabilities. Ease and convenience of operation and manipulation of components are provided for.

18 Claims, 13 Drawing Figures

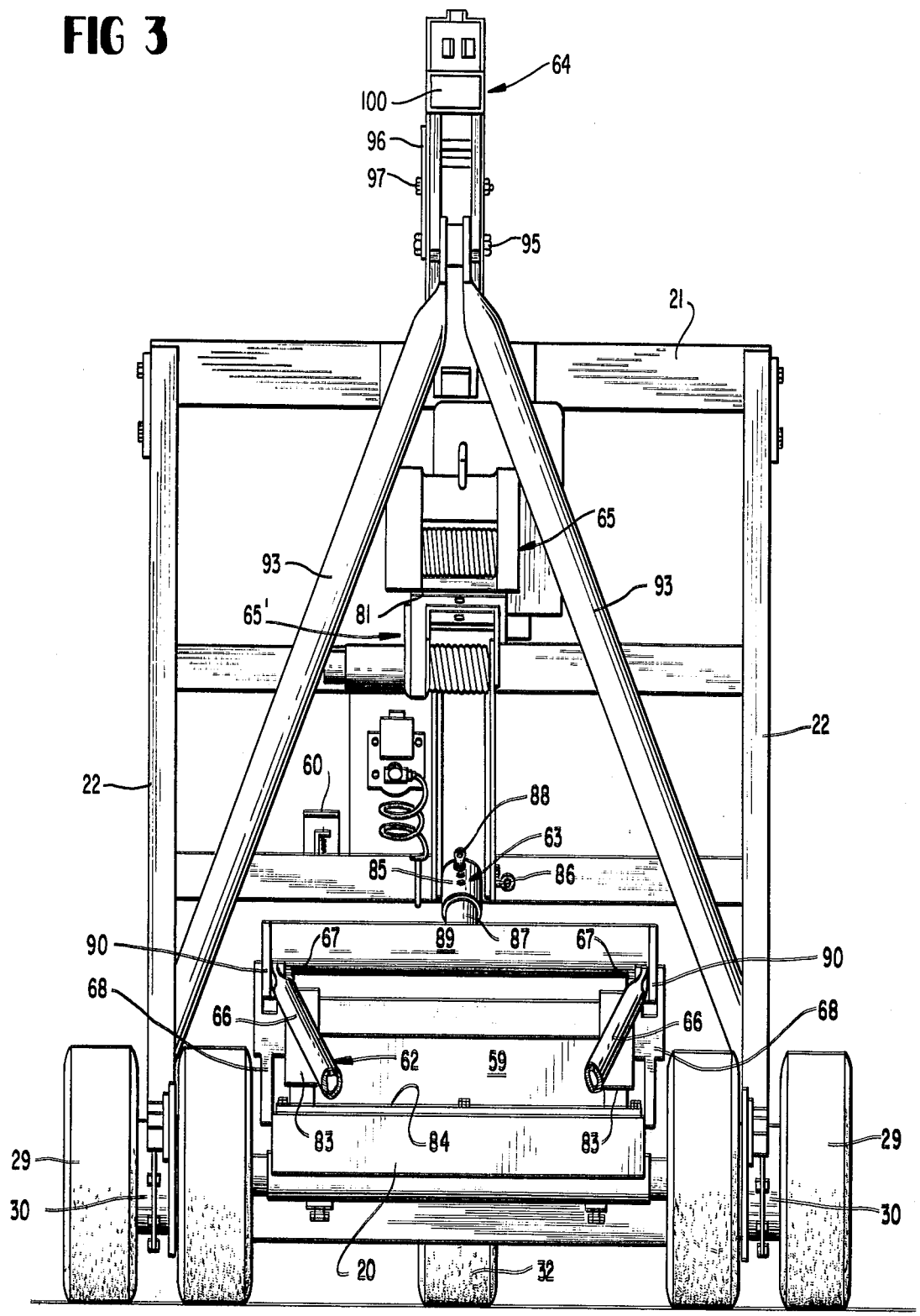

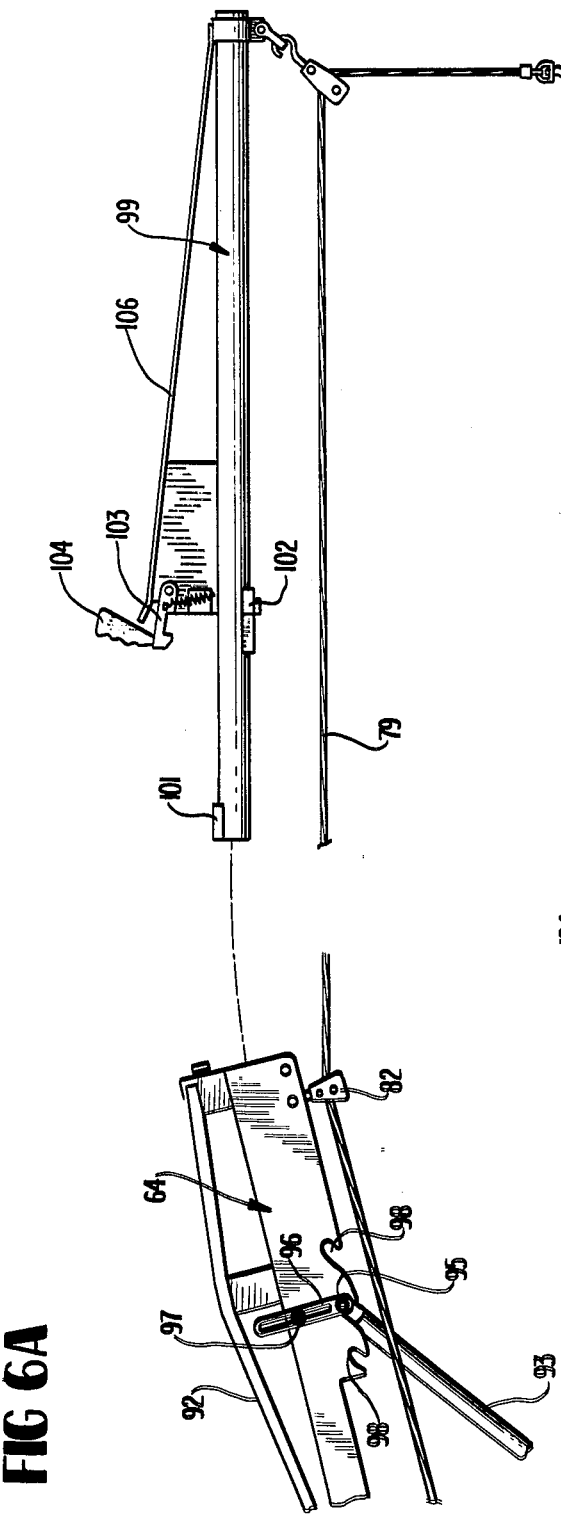
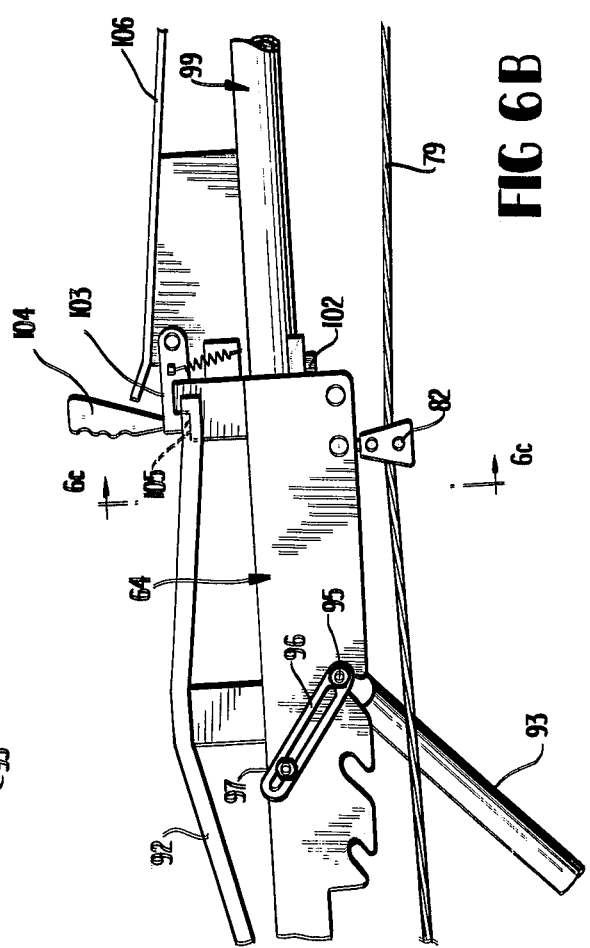
FIG 6A
FIG 6B
FIG 6C

MULTI-PURPOSE WORKING VEHICLE

BACKGROUND OF THE INVENTION

An ever-present need exists for a working vehicle particularly for hoisting and towing automotive vehicles and for other purposes which is more maneuverable and compact, generally more efficient, sturdy and durable, and more economical. The objective of the present invention is to satisfy this need in the art.

A variety of vehicle towing, hoisting and working vehicles are known in the prior art and some relevant examples of the patented prior art are indicated in the following U.S. Pats. Nos. 2,585,856; 3,179,196; 3,081,064; 3,572,455; 3,145,857; 3,877,591.

While the known prior art working vehicles possess some of the features and capabilities of this invention, they are in general less maneuverable in tight quarters and less versatile in their operational capabilities. They are also thought to be less sturdy and comparatively more expensive to manufacture in terms of what they are able to do.

The invention constitutes an improvement over the known prior art in terms of its major components, namely tricycle chassis, hitching mechanism and lifting boom with extension, and cooperating hoisting winch, and additionally the invention possesses a number of other safety and convenience features which render it more practical and more efficient in the overall than the prior art machines.

SUMMARY OF THE INVENTION

Essentially, the invention is a multi-purpose electrically powered working vehicle whose primary capability is in the towing and manipulation of automotive type vehicles, although the invention has a wide range of additional uses for lifting, hauling, loading and unloading and the like. The vehicle possesses a low elevation tricycle chassis having relatively small diameter wheels. Two wide stance dual wheels with brakes are provided at the forward end of the chassis frame with a single center steering and traction wheel placed rearwardly and directly under the upstanding main frame of the working vehicle. The operator's seat is spaced rearwardly of the rear traction wheel and at a considerable elevation so that the operator will have maximum visibility at all times and during all uses of the invention. A main lifting boom at the transverse center of the vehicle extends forwardly from the top of the upright main frame and a safe and convenient adjustable coupling between this boom and its support legs or struts is provided so that the elevation and inclination of the lifting boom may be readily adjusted. The main boom has a convenient extension which can be manually coupled thereto to greatly increase the utility of the machine as a hoisting crane for a variety of items. The boom and boom extension are operated in concert with a conveniently located winch on the upstanding main frame near the elevation of the operator's seat.

A major feature of the invention lies in its hitching mechanism which is also at a comparatively low elevation near and above the low horizontal chassis frame. The hitching mechanism features telescoping load positioning tubes and a cooperating adjustable stop element which limits the inward telescoping of one positioning tube within the other without locking the assembly. The arrangement in cooperation with a forward hitch frame and rubber belt arrangement allows all types and sizes of automotive vehicles to be engaged by the hitch in tight quarters, elevated and drawn onto the towing or working vehicle safely and with the weight of the load positioned above the towing vehicle for maximum stability of the caravan during transport. The transfer by weight by means of the hitching mechanism and hoist means to the optimum position for safe and stable transport is one of the main features and capabilities of this invention, and this load transporting optimum position can be varied depending upon the size and weight of the automobile to be handled.

BRIEF DESCRIPTION OF THE DRAWINGS

FIG. 3 is a front elevational view of the vehicle with parts broken away and parts omitted for clarity.

FIG. 6A is an exploded side elevation of a lifting boom extension and main boom and associated parts.

FIG. 6B is a fragmentary side elevation of the main and extension booms in coupled relationship.

FIG. 6C is a vertical section taken on line 6C—6C of FIG. 6B.

DETAILED DESCRIPTION

Figure 1:
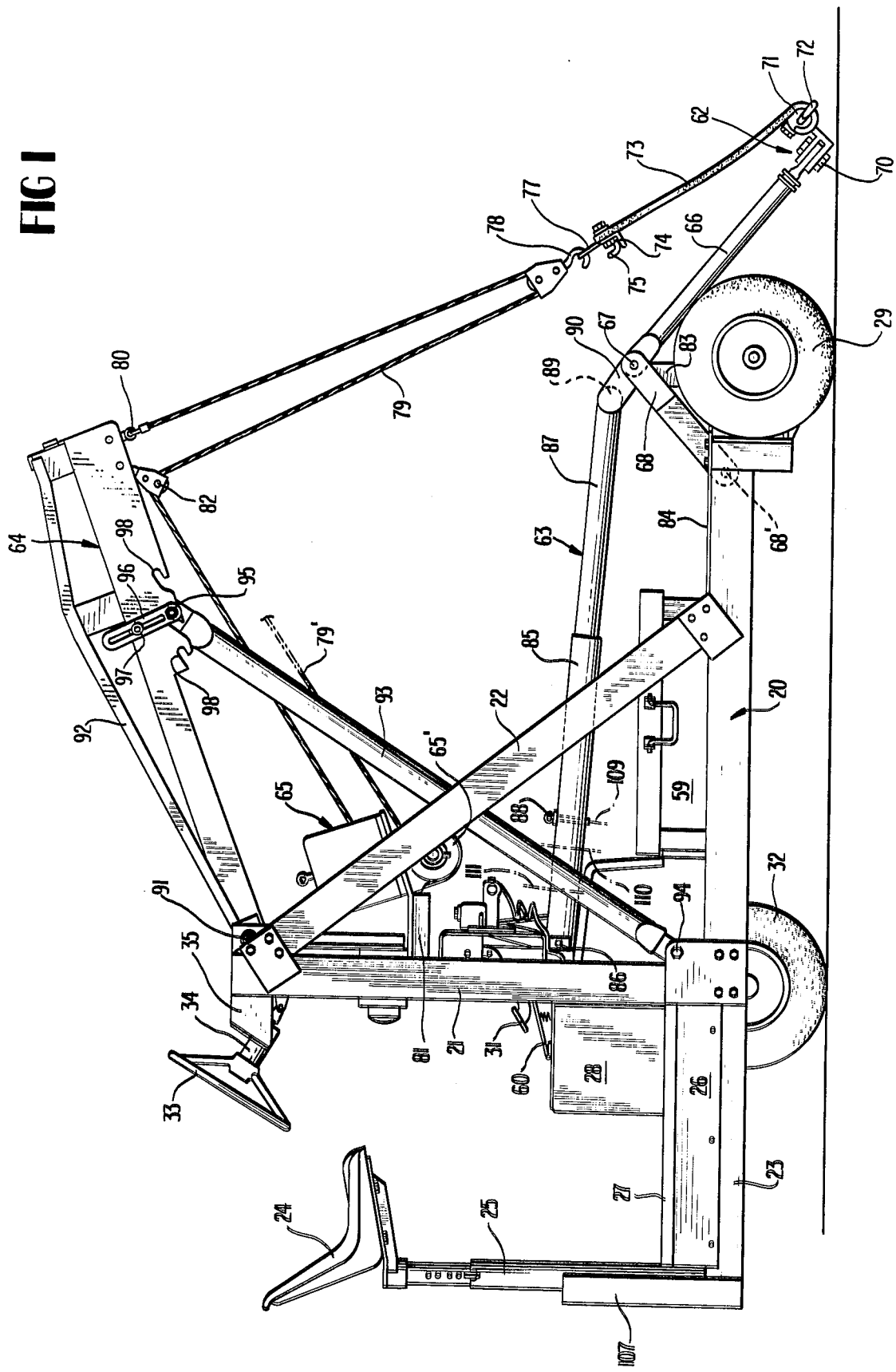
FIG. 1 is a side elevation of a working vehicle embodying the invention.

Referring to the drawings in detail wherein like numerals designate like parts, a multi-purpose working vehicle of the class previously mentioned comprises a low elevation horizontal base or chassis frame 20 on which is fixedly secured a rear vertical frame 21 braced rigidly in relation to the horizontal frame 20 by a pair a side diagonal brace bars 22. The horizontal base frame 20 has a rear tapered extension 23 at the rear end and transverse center of which is mounted an elevated vehicle operator seat 24, supported by a height adjustable pedestal 25. A housing 26 for electrical controls and an operator's floor plate 27 is also mounted on the rear frame extension 23 along with an electric drive motor housing 28.

The working vehicle has wide stance dual front wheels 29 suitably attached and journaled on the forward end of base frame 20, and these front wheels are equipped with any preferred type of braking means 30 under control of an operator's brake pdal 31.

The vehicle is of a tricycle type, as shown, and has a single combined rear steering and traction wheel 32 at the transverse center thereof and midway between the front wheels 29. The rear wheel 32 is directly under the vertical frame 21 and the drive and steering mechanisms shown in detail in FIGS. 4 and 5.

Figure 5:
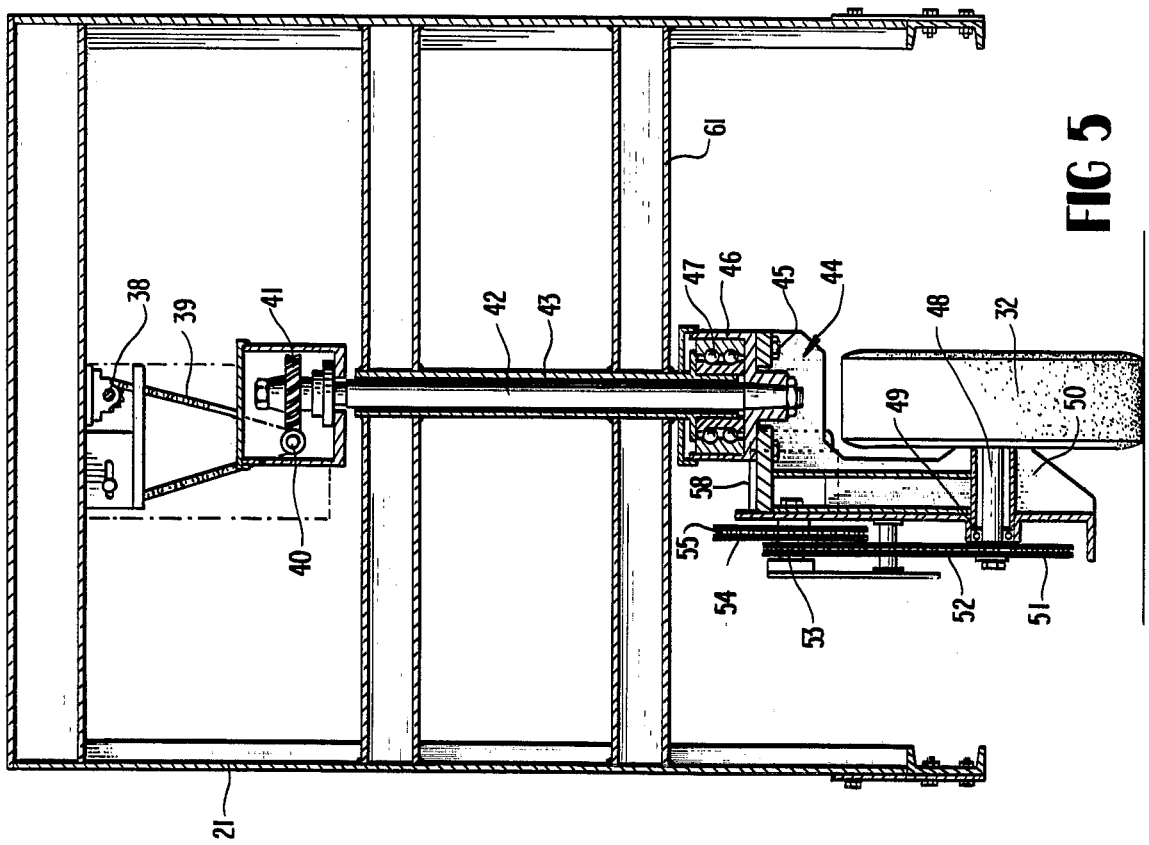
FIG. 5 is a transverse vertical cross section taken on line 5—5 of FIG. 4.
Figure 4:
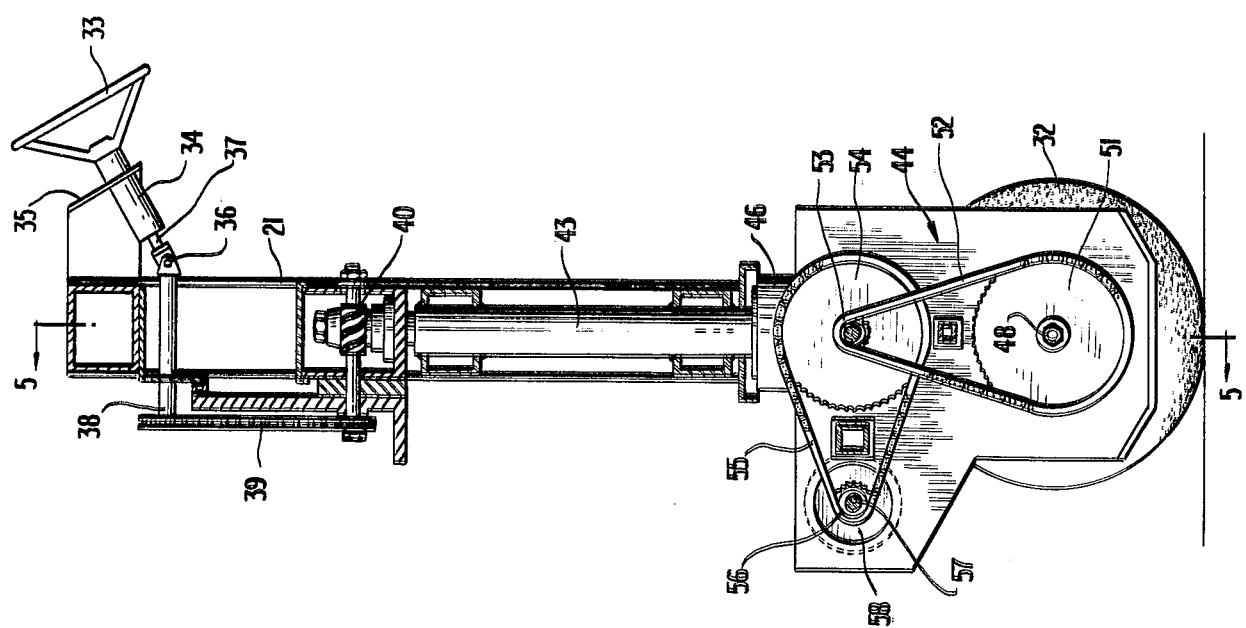
FIG. 4 is a vertical cross section, partly in elevation, taken through steering mechanism and associated parts and also showing the drive train for the steerable traction wheel of the vehicle.

Referring to FIGS. 4 and 5, an operator's steering wheel 33 on an inclined steering post 34 is mounted through a bracket 35 to the rear top of vertical frame 21. Through a U-joint 36, inclined steering shaft 37 drives a horizontal steering shaft 38 which, on the forward side of frame 21, is connected with and drives vertical chain gearing 39, coupled with and driving at its lower end a horizontal axis worm 40 which in turn drives a vertical axis worm gear 41 at the top of and secured to a vertical main steering shaft 42 at the center of the vehicle. The steering shaft 42 is enclosed in a tubular column member 43 integrated with the structure of vertical frame 21, as shown in FIGS. 4 and 5.

At its lower end, the steering shaft 42 is rigidly coupled to the frame or chassis member 44 of steering and traction wheel 32. The member 44 is coupled at 45 to a housing 46 for a ball bearing 47 whose outer race rotates with the housing 46 and member 44.

Wheel 32 has a driven axle 48 journaled in a bearing 49 in a tubular housing part 50 on the member 44 or frame. The axle 48 is driven by a sprocket gear 51 near one side of the member 44, in turn driven by a vertical sprocket chain 52 engaged and driven by a smaller overhead sprocket gear 53 on a common shaft with a larger sprocket gear 54, driven by a horizontal chain 55. The chain 55 is driven by a smaller sprocket gear 56 carried by the armature shaft 57 of an electric motor 58 suitably supported on the member 44. This motor is powered by storage batteries, not shown, contained in a storage battery box 59 on the horizontal frame 20 approximately centered between the front and rear wheels. All electrical connections are simple and conventional and are omitted in the drawings for clarity of illustration. An accelerator pedal 60 for the vehicle is also provided adjacent to the brake pedal 31, as indicated.

A feature of the vehicle is its high degree of maneuverability and very small turning radius afforded by the single steering and traction wheel 32 which is essentially a powered caster wheel capable of turning a full 180° (90° on either side of a straight-ahead position). Suitable positive steering stops, not shown, are provided on the top of member 44 for coaction with stops on a cross member 61 of the vertical frame 21. FIG. 8A shows graphically and diagrammatically the ability of the entire vehicle designated V to turn a full 180 degrees around the vertical axis of steering shaft 42 within the confines of a circle C whose radius is actually somewhat shorter than the end-to-end length L of the vehicle V.

Figure 8B:
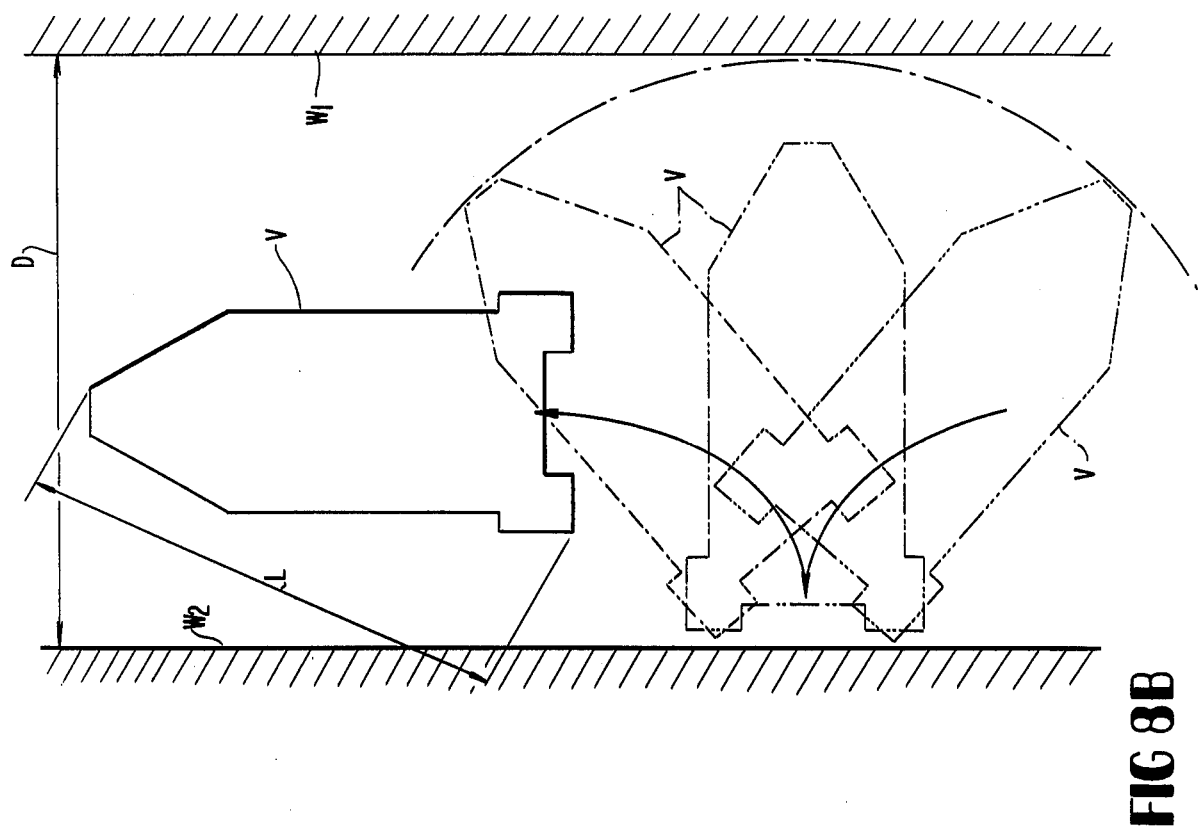
FIGS. 8A and 8B are diagrammatic plan views of the machine depicting its turning radius and high maneuverability in close quarters as between two walls.
Figure 8A:
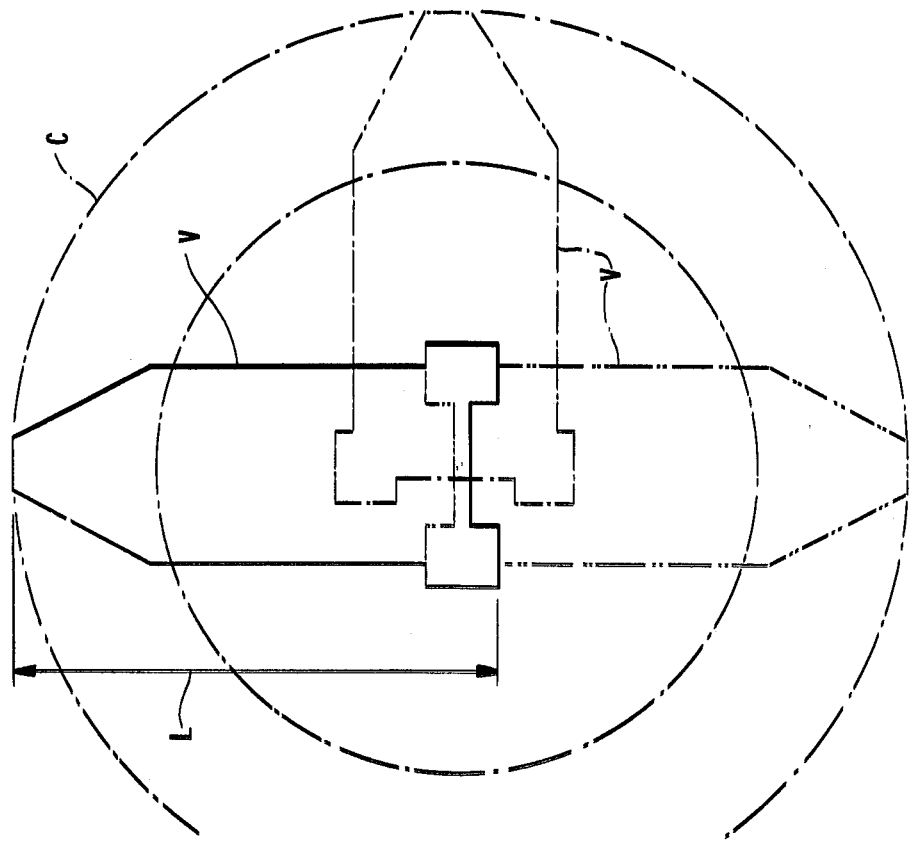

Similarly, the high maneuverability of the vehicle V is illustrated graphically in FIG. 8B. In this figure, the vehicle is shown in full lines between and parallel to two spaced walls W1 and W2 having a distance D between them only about five inches greater than the overall length of the vehicle across corners designated L in FIG. 8B. By simple maneuvering, the vehicle may turn around in the confined space with about two inches of clearance between the walls and the vehicle on each side, as indicated.

A very significant feature of the invention relates to a hitching means 62 at the forward end of the vehicle and a closely associated adjustable load positioning means 63. In cooperation with these elements are an overhead center adjustable angle main lifting boom 64 and a cooperating winch means 65, all to be described in full detail.

The hitch means 62 proper comprises a vertically swingable hitch frame consisting of two forwardly converging bars 66 whose rear ends are pivotally coupled to a pair of hitch bolts 67 carried by the leading ends of a pair of links 68 or hitch positioning elements. The lower ends of links 68 are pivotally supported on a pair of insertable and removable pins at 68' which engage links 68 through registering apertures in fixed horizontal channel members 69 connected with the horizontal frame 20, and, when needed or preferred, the pins at 68' may be slipped out to remove hitch means 62 and positioning means 63 for clearance in other than towing operations by the vehicle.

Figure 7A:
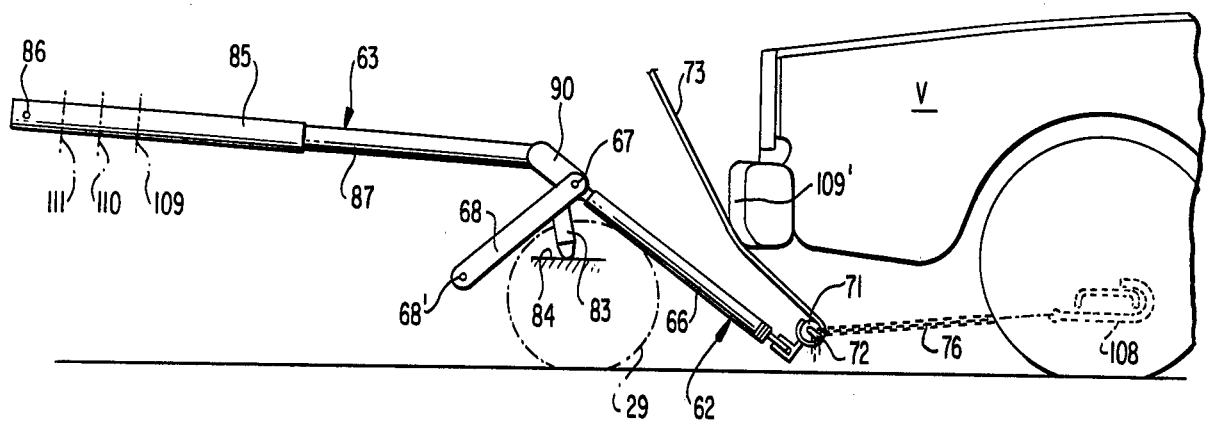
FIGS. 7A through 7C are diagrammatic elevational views of the hitching and weight transferring means in several positions and stages of use.
Figure 7B:
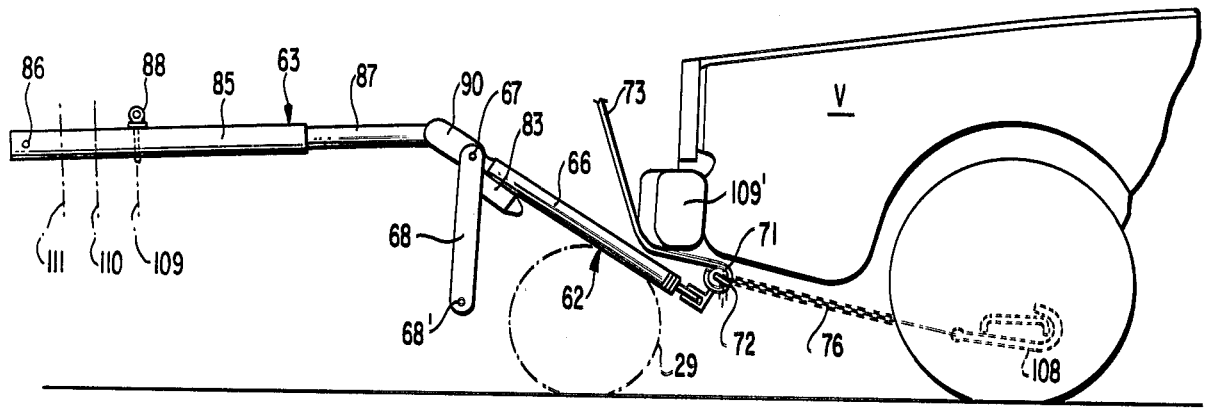
Figure 7C:
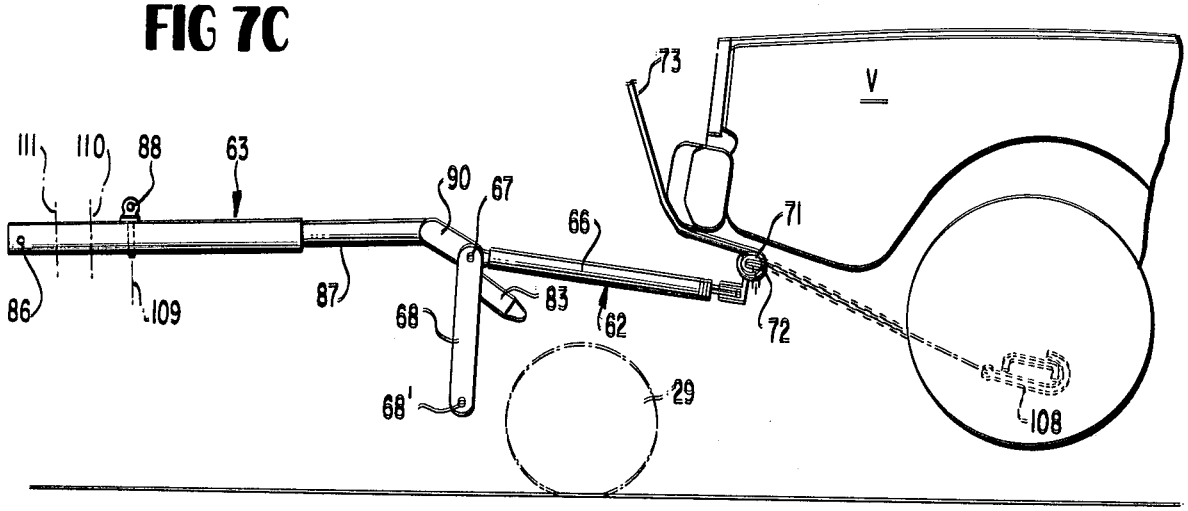

The forward ends of hitch frame bars 66 are swiveled as at 70 to a transverse hitch tube 71 having chain hooks 72 on its opposite ends and having rubber belts 73 attached thereto in a conventional manner. At their other ends, the belts 73 are firmly secured to a hitch cross angle member 74 having near its center two support hooks 75 for slack chain, as the one in FIG. 1. The customary towing chain 76 is shown in FIGS. 7A to 7C and its use will be described hereinafter. The hitch cross angle member 74 has a center eye 77 adapted to receive the lifting hook 78 of a winch cable 79 having one end connected at 80 to the forward underside of main lifting boom 64 and its opposite end operatively connected with the electrically operated winch means 65 mounted on a support platform 81 secured to the vertical frame 21. The winch cable 79 is also reeved over a guide sheave 82 on the boom 64 rearwardly of the attaching means 80 to form a cable loop, as shown.

Rigidly secured to the links 68 on their interior sides and depending therefrom are low level and angle stops 83 for the hitch mechanism. These two stop elements are adapted to bottom on the floor plate 84 of the horizontal chassis frame 20. Closely associated with the hitch means as thus far described is the previously noted positioning means 63 which positions and restricts movement of the hitch relative to the working vehicle in a manner to promote the most efficient handling of each vehicle or other load to be lifted and towed or otherwise manipulated. The positioning means 63 comprises a rear outer tube 85 at the transverse center of the vehicle and still at a comparatively low elevation. This rear tube is pivoted at 86 on the vertical frame 21 for vertical swinging movement about its rear end. A forward inner tube 87 is telescoped into the outer tube 85 and is free to move forwardly therein at all times during the operation of the hitch and positioning mechanism. However, the retractive movement of the tube 87 into the tube 85 is positively limited at three positions by a removable and replaceable stop pin 88 which can be inserted into a cross aperture of the tube 85 at the position shown in FIG. 1 and at two rearward positions. In each position, the pin 88 blocks or limits rearward movement of the tube 87 at a certain point but does not restrict its forward movement. When the pin 88 is removed and placed into a pin holder on the vehicle, not shown, the forward tube 87 can retract substantially completely into the rear tube 85. Thus, the positioning means 63 has four positions of use or control on the hitch and the load being lifted, as will be amplified in connection with FIGS. 7A through 7C. The telescopic adjustment of the positioning means 63 by positioning or completely removing the stop pin 88 is a manual operation and the selected adjustment is dictated by the size and weight of the vehicle being manipulated by the invention.

At its forward end, the tube 87 is rigidly joined to a cross tube or member 89 having opposite end legs 90 which are apertured for pivotal reception of the floating hitch bolts 67. Thus, the hitch bolts 67 are connected in the assembly with the links 68 carrying the limit stops 83, the hitch frame bars 66 at their upper rear terminals, and the legs 90 of the positioning means 63. As shown in FIG. 1, the legs 90 are set at an angle to the axis of the forward tube 87 and this relationship is rigid and unchanging during the operation of the mechanism.

The main lifting boom 64 has its rear end pivotally coupled by a pin 91 to the top and forward side of vertical frame 21. The main lifting boom is reinforced on its upper side by truss members 92 for added rigidity and strength. It is supported in its various use positions by inclined divergent struts 93 which are compression members. The lower ends of these struts are coupled at 94 to the opposite sides of the base frame 20. Their upper ends are joined through an adjusting bolt 95 connected through a slotted safety link 96 with a guide pin 97 for the safety link projecting from one side of the boom 64. The adjusting bolt 95 is selectively engageable within any one of three spaced adjusting and locking slots 98 formed in the bottom of the boom whereby its angle and the height of its forward end may be varied to meet the needs of particular load lifting and towing operations and the like. The pin 95 is shown in the intermediate slot 98 in FIG. 1 to support and lock the boom 64 in the intermediate position through the struts 93.

A further feature of the invention resides in the provision of a lifting boom extension 99 for the main boom 64 shown particularly in FIGS. 6A through 6C. In FIG. 6A, the boom extension 99 is still separated from the main boom 64 which has a square socket 100, FIG. 6C, in its forward end adapted to receive the rear end of the boom extension telescopically. At its rear end, the boom extension 99 carries a top anchoring projection 101 and somewhat forwardly thereof a bottom anchor member 102 is provided on the bottom of the boom extension. When the extension is inserted into the forward square socket of the main boom 64, FIGS. 6B and 6C, the elements 101 and 102 are interlocked with receiving recesses in the socket and the extension 99 is locked in the use position on the main boom 64 by a spring-urged pivoted latch 103 having a release handle 104. The latch 103 cooperates with a detent 105 on the top of the main boom 64 at its forward end. The boom extension 99 also preferably has a top tension brace 106, as shown in the drawings.

When the extension boom 99 in installed, the effective length of the main boom 64 is materially increased and the utility of the working vehicle as a small crane for a wide variety of purposes is also increased. During such usage, the hitch means 62 and positioning means 63 can be retracted to the maximum possible extent on the machine or can be removed therefrom entirely should this be desirable in order to provide additional clearance. The use of the vehicle as a lifting crane is very appropriate for loading and unloading pick-up trucks and the like for removing engines from vehicles and from any other similar operation.

Figure 2:
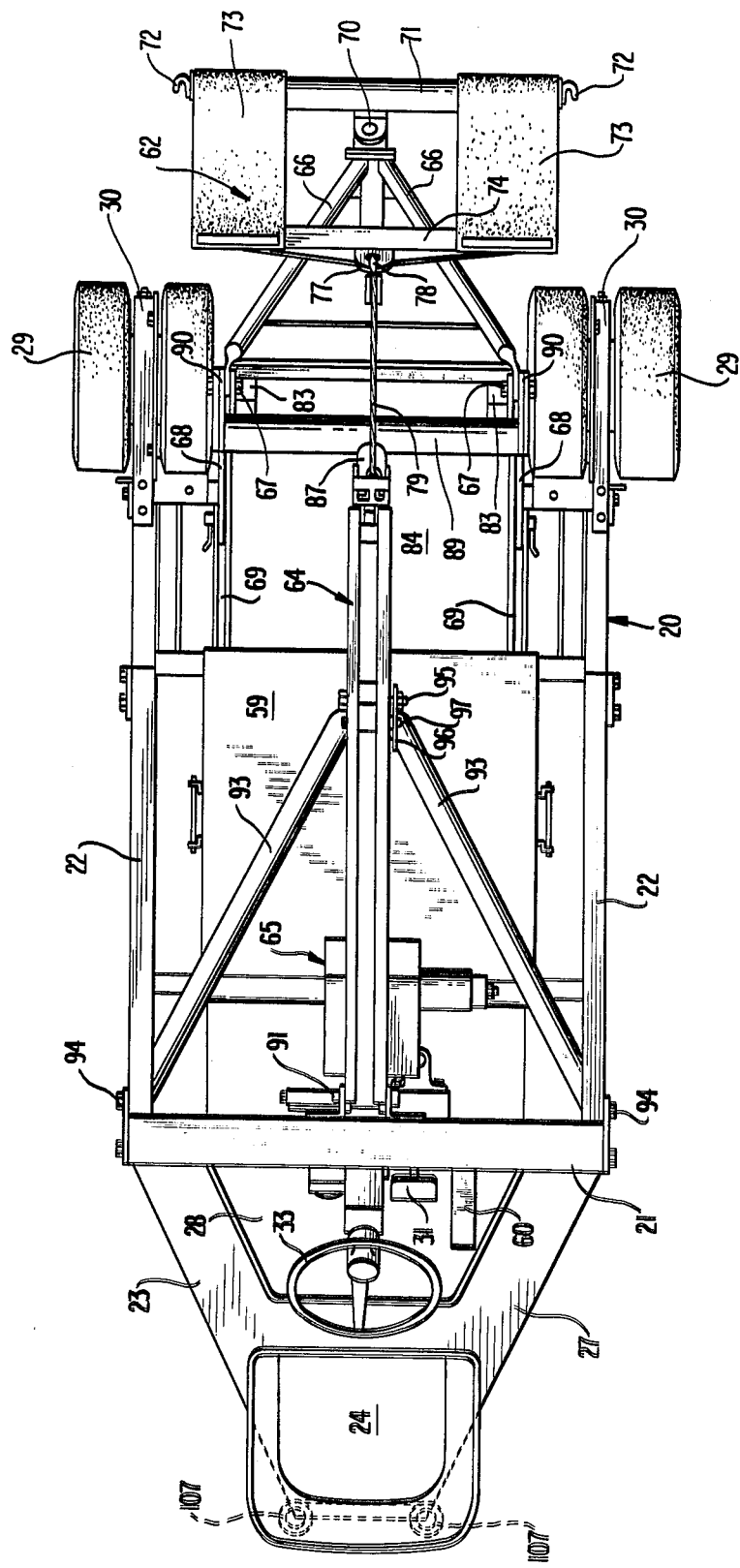
FIG. 2 is a plan view thereof.

At the extreme rear end of the vehicle defined by the base frame extension 23, a pair of very sturdy vertical posts 107 are rigidly secured as shown in FIGS. 1 and 2. These posts serve as pushing elements and safety bumper elements near the position of the operator's seat 24. For example, the posts 107 can be employed to push another vehicle with the machine operating in reverse, thus giving it still another capability. The machine is operated in reverse a great deal of the time during its use for towing vehicles and can be driven forwardly or in any required intermediate direction as noted in the description of the steering means. The low profile of the frame 20, the small wheels 29 and the low elevation hitch 62 and positioning means 63 enable the invention to maneuver in tight quarters and at various angles to place the hitch under a vehicle to be towed, as illustrated particularly in FIGS. 7A to 7C.

Referring now to these schematic figures, the operation of the working vehicle for hitching up to a disabled automobile or the like, lifting and transporting the same, is well illustrated and highlights the principal capability of the invention or its main usage. The other usages, such as pushing, loading and unloading, and a variety of crane applications require no detailed description to fully understand, and FIGS. 7A to 7C show the more complicated procedure for hitching up to a vehicle, lifting it and transferring the weight of the load properly onto the working vehicle for efficient and safe transport by minimizing the tendency to tip the working vehicle. In other words, the center of gravity of the load is advantageously located by the unique combined operation of the hitch 62 and positioning means 63.

The experienced operator, after sizing up the weight and size of a disabled vehicle, will adjust the two tubes 85 and 87 in the manner already described by placing the stop pin 88 in one of its three blocking positions relative to the forward tube 87 or by completely removing the stop pin to allow full rearward movement of the tube 87. Following this basic adjustment and referring now to FIGS. 7A through 7C, the following procedure is followed in the operation of the hitching and positioning mechanism.

Referring first to FIG. 7A, the hitch 62 and the telescoping positioning means 63 are shown when a vehicle V to be lifted and towed has just been engaged by the invention. This corresponds to the position of the invention in FIG. 1. The stardard towing chain omitted in FIG. 1 has its end hooks 108 engaged with the vehicle's lower control arms. The chain is stretched taut and appropriate links are engaged with the two chain hooks 72 of transverse hitch tube 71. The remaining slack chain between these hooks, not shown, can be hung on the upper chain support hook 75. The rubber belt sections 73 are now in rather soft contact with the bumper 109' of the vehicle V. The depending stops 83 are resting on the floor plate 84 of the working machine and this rigidly supports the telescopic positioning device or means 63 in a near level but slightly inclined position as shown in FIGS. 1 and 7A. The forward tube 87 of the positioning device is extended from the rear tube 85 and at this time the operator, after inspecting the nature and size of the vehicle, will elect to place the stop pin 88, FIG. 7B, in one of its three positions 109, 110 or 111 where it will block and limit rearward movement of the tube 87 at a certain location when the vehicle begins to be lifted by operation of the hoist winch 65.

Following placement of the blocking pin 88 in one position, FIG. 7B, which happens to be the forwardmost position 109, the hoist which is activated by the operator and the lifting cable 79 begins to pull up on the cross angle member 74 of the hitch mechanism. This stretches the belts 73 around the bumper 109', FIG. 7B tending to pull the vehicle V rearwardly by tension on the chain 76 and upwardly by the action of the hitch frame bars 66 about the axis of hitch bolts 67. However, and simultaneously, the positioning means 63 will react to the hoisting operation and forward tube 87 will slide rearwardly in tube 85 until it makes solid contact with stop pin 88. When this occurs, the hitching and positioning mechanisms 62 and 63 will be in the condition shown in FIG. 7B. The retraction of tube 87 with its rigid legs 90 will have swung pivoted links 68 to the near vertical positions shown in FIG. 7B, thus raising the depending stops 83 carried by these links and moving the hitch frame bars 66 from their positions in FIG. 7A somewhat upwardly and rearwardly to a more level angle.

Moving to FIG. 7C, continued hoisting by the winch 65 and cable 79 will produce no further rearward rotation of the links 68 since the tube 87 can retract no further. Consequently, the hitch frame bars 66 must swing upwardly about the axis of hitch bolts 67 and in so doing the vehicle V is lifted, as shown in FIG. 7C and is ready for transport. The automatic retractive action of the positioning means 63 in the hoisting of the vehicle has drawn the vehicle toward the center of the working machine sufficiently to position the center of gravity at a good location for traction and steering control through the rear wheel 32 of the working machine. Without the telescopic adjustable positioning device, the hitch would position all loads at the same position relative to the working vehicle and with some heavy vehicles the leverage on the working vehicle would be too severe to achieve good traction and steering, as may be readily understood.

Lighter loads can be safely handled with the stop pin 88 in the forward position 109, as indicated in the drawings. Heavier loads can be lifted and towed with the pin 88 placed in one of the two rearward positions 110 or 111, or with the blocking pin entirely removed when maximum loads are being handled. In this latter case, the forward tube 87 can telescope fully into the rear tube 85 and the moment arm of the lifting mechanism is reduced to a minimum and the vehicle or load is pulled the greatest possible distance rearwardly toward the center of the working machine to assure traction and steering through the rear wheel 32. At this fully retracted condition of the positioning means 63, not illustrated in the drawings, the links 68 will swing to the rear well beyond the vertical and will assume a fairly steep rearward inclination, and during the retraction motion, the hitch frame bars 66 will contact and be limited in their further background movement by the raised stops 83, along with positioning means 63 and links 68 until further progressive lifting by cable 79 changes the upwardly progressive angle of the hitch bars 66 to permit a proportional progressive backwards inclination of links 68 and progressive retraction of positioning means 63 and hitch 62. If the stops or retraction motion limiting members were not present, the backwards motion of the various members and links would be completed too early in the lifting cycle and hitch tube 71 with the vehicle V chained to it would not appropriately clear the front end of the working vehicle. Further upward and backward pulling by cable 79, retracts the components until tube 87 contacts stop pin 88, in whatever position it is located or the end of tube 85 if pin 88 is removed. From then on retraction is stopped completely and bars 66 proceed in an upward pivoting motion around bolts 67 as the lifting operation continues.

Upon unloading an already lifted vehicle V, the function of the stops 83 is perhaps even more important than in the lifting operation. Since cable 79 is always providing a backward pull due to the location of sheave 82 and cable anchor 80 on the opposite side of the axis of wheels 29 from the hitch tube 71, upon reverse operation of winch means 65 in the lowering cycle the vehicle V would be unloaded onto the front end of the working vehicle of the invention except for the operation of the stops 83. As the previous described lifting operation is reversed, the lowering of the vehicle V starts with the tube 87 in contact with pin 88, or the bottom end of tube 85, and hitch bars 66 pivoting downwardly around bolts 67. When hitch bars 66 contact stops 83, further lowering of the weight of vehicle V with cable 79 trips links 68 gradually toward the front by pivoting action around pins 68', thus pulling tube 87 out of tube 85 and at the same time, by reaction, progressively moving vehicle V and the working vehicle of the invention away from each other as lowering continues. Thus vehicle V is unloaded onto the ground or floor only after it has properly cleared the front end of the working vehicle.

A lower capacity second winch 65' may be mounted on the underside of support platform 81, beneath winch means 65, as shown in FIGS. 1, 2 and 3. The cable 79' from this winch may be utilized in a variety of ways, and will be apparent to those familiar with using winches, to substantially increase the range of working capabilities of the multi-purpose working vehicle of the invention. The second winch permits the cable 79' to be reeved over and used with the boom extension 99 in lighter crane operations, instead of cable 79 as shown in FIG. 6A, thus allowing cable 79 to remain connected to hitching means 62 and eliminating the inconvenience and time that would normally be required to disconnect cable 79 from the hitching means 62 and reeve it over the extension 99. A remote control means, not shown, may be connected to control the second winch from a remote location. This is very useful for many one-man operations, such as, removing an engine from a vehicle, etc. When used in cooperation with winch means 65 and boom extension 99, with one winch such as 65' pulling by its cable reeved through a guide sheave on the outer end of the boom extension 99, and the main winch means 65 pulling through the arrangement on the main lifting boom 64 as shown in FIG. 1, simultaneous and/or cooperative operation of both winches pulling as required on a load give the vehicle the capability to pull backward on a load hung from the outer end of the boom extension 99, thus creating, on crane operations, the same positive and advantageous changes in center of gravity that the positioning means 63 creates in car towing operations. The combined use of the two winches connected to a load enables the vehicle to self-load that load and place it onto the floor plate 84 for transportation, or provides the capability of moving a load within tight quarters where the combined length of the vehicle and load prove to be a matter of importance.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. A working machine comprising a wheeled frame including steering and power driving means, a main elevated lifting boom on said frame, winch and cable lifting means associated with the boom, a hitch means and an associated load and hitch positioning means on the wheeled frame substantially below said boom, fore and aft vertically swingable links pivoted to the wheeled frame near its front and sides, common pivot means connecting the tops of said links with said hitch and positioning means, means on the hitch means forwardly of said common pivot means for lifting the hitch means and adapted for connection with the winch and cable lifting means, said positioning means having a rear end pivoted to said wheeled frame substantially rearwardly of said links and said positioning means including forwardly extensible and rearwardly retractable interfitting parts, and a multi-position abutment element placeable at selected positions on said positioning means and adapted to positively limit retraction of the positioning means while allowing free forward extension of such means.

2. A working machine as defined in claim 1, and said extensible and retractable positioning means comprising forward and rear telescoping members, and said abutment element comprising a stop pin insertable through apertures of the rear member at plural longitudinally spaced points thereon.

3. A working machine as defined in claim 2, and depending stops rigid with said links and being engageable with a floor portion of said wheeled frame to limit downward swinging movement of the links in one direction and downward swinging movement of the positioning means.

4. A working machine as defined in claim 3, and said hitch means including a hitch frame having two forwardly converging hitch bars, the rear ends of said hitch bars pivoted to and supported by said common pivot means.

5. A working machine as defined in claim 4, and said positioning means including a forward end cross member, rigid leg extensions on opposite ends of said cross member and being pivotally connected with and supported by said common pivot means.

6. A working machine as defined in claim 5, and said common pivot means comprising a pair of transverse axis coaxial floating pivot bolts.

7. A working machine as defined in claim 4, and a cross member swiveled to the forward end of said hitch frame, elastic belt members attached to the hitch frame cross member, another cross member attached to the free ends of the elastic belt members, and said means adapted for connection with the winch and cable lifting means being on said another cross member near the center thereof.

8. A working machine as defined in claim 1, and said wheeled frame including a low elevation horizontal base portion to which said links are pivoted near the forward end of the base portion, and small diameter spaced wheel assemblies on the forward end of said base portion enabling the base portion with said hitch and positioning means to maneuver beneath automotive vehicles and the like in the use of the working machine for lifting and towing.

9. A working machine as defined in claim 8, and said wheeled frame further including a substantially vertical portion spaced substantially rearwardly of said links, and the rear end of the positioning means pivoted to said vertical frame portion at an elevation near and above the horizontal base portion of the wheeled frame.

10. A working machine as defined in claim 9, and said main lifting boom being pivoted to said vertical wheeled frame portion near the top thereof and extending forwardly of the vertical frame portion at the transverse center of the wheeled frame in symmetrical overlying relation to the hitch and positioning means.

11. A working machine as defined in claim 10, and rigid support struts for said main lifting boom on said wheeled frame and adapted for supportive connection with the boom at plural longitudinally spaced points thereon to vary the inclination of the boom during use.

12. A working machine as defined in claim 11, and said boom having plural locking slots in its lower side, said struts converging upwardly and having a transverse coupling element selectively engageable in said slots, and a safety slotted suspension link engaging a fixed link support element on one side of said boom and being attached to said coupling element whereby the latter can be safely disengaged from said slots.

13. A working machine as defined in claim 12, said struts being upwardly and forwardly inclined and having widely spaced lower terminals, and means coupling said lower terminals to opposite sides of the wheeled frame near the base of said vertical frame portion.

14. A working machine as defined in claim 10, and a longitudinal extension member for said main lifting boom adapted to be socketed therein and mechanically coupled and releasably latched thereto for materially increasing the lifting radius of the main boom.

15. A working machine as defined in claim 1, and a rear extension on said wheeled frame, an elevated operator's seat on the rear extension, a vertical frame portion on the wheeled frame forwardly of said seat, and manual steering and driving controls on said vertical frame portion.

16. A working machine as defined in claim 1, and said wheeled frame comprising a tricycle frame having a horizontal base portion and a substantially vertical portion, spaced wheel assemblies on the forward end and opposite sides of the horizontal base portion, a single machine steering and traction wheel at the transverse center of the wheeled frame and beneath said vertical frame portion, and means supported on the vertical frame portion for steering and powering said single steering and traction wheel.

17. A working machine as defined in claim 16, and said last-named means comprising a vertical steering shaft at the transverse center of the vertical frame portion, a manual steering wheel and associated gearing coupled with said vertical steering shaft to turn it in opposite directions, a steering and traction wheel mounting member coupled to the lower end of the vertical steering shaft and turning therewith, and power drive gearing and motor means for said steering and traction wheel bodily mounted on said mounting member.

18. A working machine as defined in claim 17, and said power drive gearing and motor means including an electric drive motor, and a storage battery compartment on said wheeled frame.

* * * * *